United States Patent
Maine

(10) Patent No.: US 7,165,244 B2
(45) Date of Patent: Jan. 16, 2007

(54) WEB APPLICATION CODE CONVERSION SYSTEM

(75) Inventor: Dale W. Maine, Simsbury, CT (US)

(73) Assignee: Hamilton Sundstrand Corporation, Rockford, IL (US)

(*) Notice: Subject to any disclaimer, the term of this patent is extended or adjusted under 35 U.S.C. 154(b) by 666 days.

(21) Appl. No.: 10/354,356

(22) Filed: Jan. 30, 2003

(65) Prior Publication Data
US 2004/0154004 A1   Aug. 5, 2004

(51) Int. Cl.
G06F 9/45 (2006.01)
G06F 15/00 (2006.01)

(52) U.S. Cl. .................... 717/137; 717/143; 715/513

(58) Field of Classification Search ............. 717/136, 717/137, 106, 109; 714/8
See application file for complete search history.

(56) References Cited

U.S. PATENT DOCUMENTS

| | | | |
|---|---|---|---|
| 5,940,615 A * | 8/1999 | Novick et al. | 717/109 |
| 6,092,037 A * | 7/2000 | Stone et al. | 704/8 |
| 6,928,640 B1 * | 8/2005 | Schlussman | 717/137 |
| 6,983,238 B1 * | 1/2006 | Gao | 704/8 |
| 2002/0147749 A1 * | 10/2002 | Ortiz et al. | 707/523 |
| 2003/0208743 A1 * | 11/2003 | Chong et al. | 717/106 |
| 2006/0064631 A1 * | 3/2006 | Parker | 715/500 |

OTHER PUBLICATIONS

Aho et al., Compilers, Principles, Techniques, and Tools, Sep. 1985, Addison-Wesley, Chapters 1-4.*
Kamal Patel, C# to VB.NET Code Conversion Web Service, Mar. 2002, http://www.c-sharpcorner.com/Code/2002/Mar/CS2VBConversionWebService.asp.*
Eric M. Burke, Java™ and XSLT, Sep. 2001, Chapter 5, http://www.topxml.com/xls/articles/java_xslt/default.asp?printerversion=true.*
IBM, WebSphere.TM. 2.0.3x to 3.5.0.2 API Migration Tool, Oct. 21, 2002, IBM TDB.*
IBM, Editsystem Language Parsers for Mixed Documents, Jun. 1, 2000, IBM TDB.*

* cited by examiner

Primary Examiner—Antony Nguyen-Ba
(74) Attorney, Agent, or Firm—Carlson, Gaskey, & Olds

(57) ABSTRACT

A web application code conversion system (100) translates web application code written in a first language into a second language. A scanner (104) scans the old code and generates tokens corresponding to keywords, variable names, and other strings in the old code. A parser (106) determines the functional equivalents of the tokens in the new code and generates the new code in the second language.

16 Claims, 2 Drawing Sheets

WEB APPLICATION CODE CONVERSION SYSTEM

REFERENCE TO COMPUTER PROGRAM LISTING APPENDIX

One CD-ROM containing a file entitled "AppendixA.txt" illustrating one example of language conversion code is filed herewith and incorporated by reference.

TECHNICAL FIELD

The present invention is directed to code used to generate web applications, and more particularly to a system that converts web application code from one language to another.

BACKGROUND OF THE INVENTION

Developing web applications often require a great deal of time and investment. As technology changes, however, web applications that are several years old may be written in a language that is being phased out by a new language. New functions may be added to an existing web application through patches written in the old language to preserve the initial investment of developing the web application, but this method fails to take advantage of new technology developments. Adopting the new technology incorporates new technology developments into the web application, but this method may fail to preserve previous investments in the application.

There is a desire for a system that can take advantage of new web application technology while preserving investments made into an existing web application using older technology.

SUMMARY OF THE INVENTION

Accordingly, the invention is directed to a web application code conversion system that can automatically convert web application code from a first language to a second language. The system includes a scanner that reads old code written in the first language and detects tokens that each correspond with a language element in the old code. A parser then receives each token from the scanner and uses a state transition table to determine the actions necessary to generate new code in the second language.

By translating web application code from an old language into a new language, the inventive system preserves investments made in old technologies while still taking advantage of new technological developments.

DETAILED DESCRIPTION OF THE EMBODIMENTS

Generally, the invention is directed to a system that can convert a web application program written in a first language into a second language, preserving all the functionalities of the original web application. For example, if a web application is originally written in PL/SQL® code (PL/SQL® is a registered trademark of Oracle®), the inventive system can convert the code to a different language, such as Visual Basic®.NET. The input code and the generated output code will be functionally identical because the output code is simply generated from the input code and written in a different language.

Figure 1:
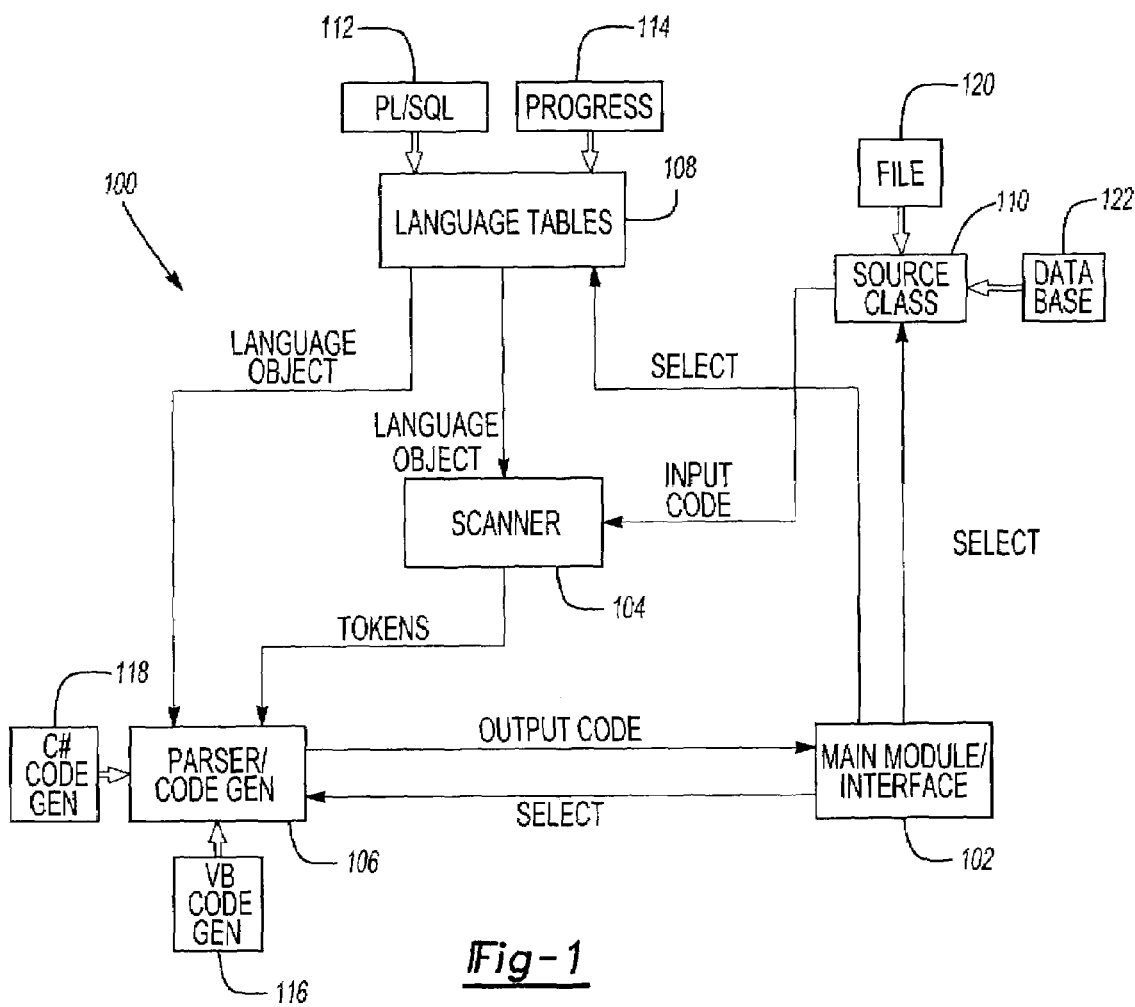
FIG. 1 is a block diagram illustrating an overall system according to one embodiment of the invention.

One embodiment of the inventive system 100 is an object-oriented structure, as illustrated in FIG. 1. A main module/interface 102 acts as the interface between a user and the system 100. The system also includes a scanner 104, a parser 106, one or more language table modules 108, and one or more source class modules 110. As will be explained in greater detail below, the scanner 104 and parser 106 conduct the actual code translation functions, but the language table module 108 and the source class module 100 provide greater flexibility by accommodating multiple languages and/or source file formats. The scanner 104 scans the input code and breaks the scanned input into words and symbols according to the rules of the old language, while the parser 106 incorporates the code generator that translates the input code into a functionally equivalent output code in the new language.

In the example shown in FIG. 1, the user can select via the main module 102 among two possible input languages (e.g., PL/SQL® 112 and Progress 114) and two possible output languages (e.g., Visual Basic®.NET 116 and C#® 118). Of course, any number of input and output languages can be incorporated into the system 100; because each language has its own separate object class, the system 100 itself does not need to be reprogrammed to accommodate a new input and/or output language. The scanner 104 and parser 106 follow the same rules regardless of the input and output code language, but they only use the languages selected by the user to carry out the conversion.

This flexibility is implemented through object inheritance. Language tables 108 is a base class that defines the structure of the input language scanner 104 and parse tables used by the parser 106. The scanner 104 and basic parser 106 functionality are implemented to work with any instance of the language tables class 108. The PL/SQL® 112 class inherits from the language tables 108, following the same structure as the language tables class 108 but also including specific table information for the PL/SQL® 112 input language. When the user selects PL/SQL® language as the input language, an object of that type (i.e., the class that defines the tables for the selected language) is instantiated for use by the scanner 104 and parser 106. Likewise on the output, the parser 106 class is a base class that includes parsing functions, but only selected output language-independent code generation functions. Language specific classes such as Visual Basics®.NET 116 class are implemented to inherit from the parser 106 and supply language-specific code generation rules. Any number of classes could be implemented with code generation for different languages; when the user selects the desired output language, the main module 102 instantiates the object of that specific type.

The source class module 110 allows the user to select the source of the input code (e.g., a file 120 or a database 122). Like the other system components, the scanner 104 module itself does not need to know the nature of the input source in order to read in the input code; it only needs a source object that inherits from the source 110 class as the file 120 and database 122 classes do. The system's structure therefore allows the addition of different input and output languages as well as source formats without modifying the system 100 itself.

Although FIG. 1 shows an object-oriented approach to the inventive system, the language table 108, source class module 110, and parser 106 may themselves incorporate rules corresponding to specific languages and/or source formats, particularly if the system 100 will be used only to convert web application code from one known language and one known format into another known language. This variation still would fall within the scope of the invention.

Figure 2:
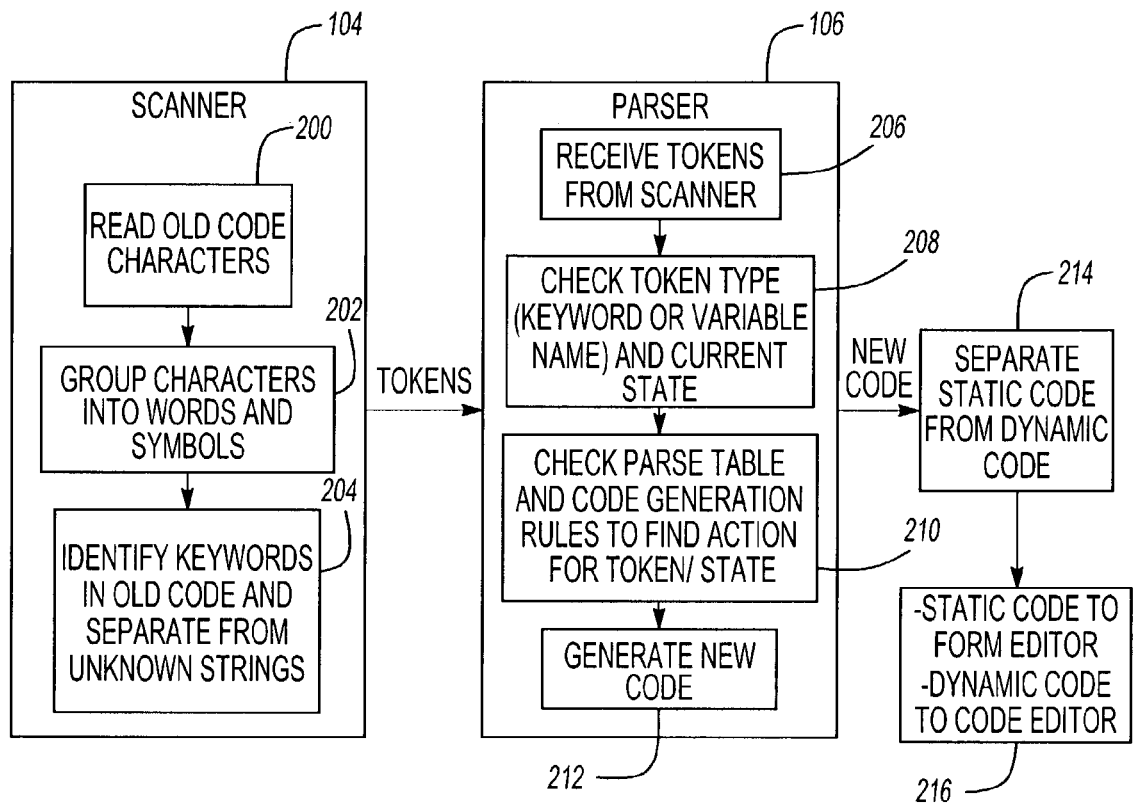
FIG. 2 is a block diagram illustrating processes carried out by a portion of the system shown in FIG. 1.

FIG. 2 illustrates the operation of the scanner 104 and the parser 106 in more detail. After the user selects the input code language, the scanner 104 reads each individual character of the input code (block 200) and groups the individual characters into words and symbols (block 202) to generate "tokens". The scanner 104 also identifies keywords in the old code and separates the keywords from unknown strings, such as variable names (block 204). The scanner 104 recognizes the keywords based on the language-specific information from the language table 108. Because each language may have its own specialized keywords, the language table 108 provides the scanner 104 with a virtual vocabulary so that it can group the characters into tokens usable by the chosen input code language. The tokens themselves may be formed via any known state transition system.

Once the scanner generates the tokens corresponding to the old code, the tokens are sent to the parser 106 for actual translation into the new language. When the parser 106 receives a token from the scanner 104 (block 206), the parser 106 determines the token type (e.g., symbols, keywords, numbers, variable names, etc.) and a current operational state of the parser 106 (block 208). The token type and state information are used to enter a parse table to find new states and actions that will eventually generate the output code (block 210). The parse table referenced by the parser 106 dictates how the translation actually takes place; as noted above, the parser 106 runs the selected output language module 116, 118 and translates the tokens according to the rules in the selected module 116, 118 to generate the new code (block 212).

The parse table is built like a code compiler that has a scanner that reads the input code one character at a time and builds the characters into words or separates symbols from the other characters. The parse table used by the parser 106 can be any state transition table adapted to generate code. State transition tables are known in the art for compiling data and generating object code. Thus, developing a state transition table that can generate high-level language code instead of object code is within the capabilities of one of ordinary skill in the art. Generally, the actions called for in the parse table are designed to generate new code that functionally corresponds with the old code.

As the parser 106 receives each new token, it decides what action it should take from the parse table. From the parse table information, the parser 106 can determine the function of each statement in the old code and generate new code that carries out an equivalent function (block 212). In some cases, there is not a one-to-one correspondence between old code commands and new code commands; these differences can be incorporated into the rules and actions called by the parse table. Depending on the differences between the old code and the new code, some tokens can be translated literally, while other tokens need to be renamed to conform to the requirements of the new code. Further, some token sequences require restructuring to carry out the same function in the new language. Because the parser 106 receives the tokens sequentially, the program flow of the old code can be preserved when it is translated into the new code.

Once the parser generates the new code, the new code can be output of the main module/interface 102 for display, storage or further processing. For example, the new code can be edited, manipulated, and otherwise treated as if the web application had been originally written in the new language rather than translated from an old language.

One post-processing option is shown in FIG. 2. As is known in the art, many web applications have static content (such as HTML) and dynamic content generated by programming code mixed together. Although newer languages include form editors that simplify maintenance of the static content, the new code generated by the parser 106 may still have the limited functionalities of the old language and fail to distinguish static content from dynamic content.

To take advantage of form editing functions in the new language, the system 100 may allow a user to identify and separate the static output statements (e.g. a simple print statement of a literal string) from the dynamic code (block 214), forward the static web page content to a form editor and forward the dynamic code to a code editor (block 216). In one embodiment, the system identifies the static strings in the new code and concatenates a series of static strings together as a single static string. Once the system 100 identifies the static code, it can separate the static code from the dynamic code. The system 100 may also detect statements that could generate dynamic content, including print statements or subroutine calls, and rewrite the new code so that any dynamic content is placed into program variables rather than being output directly. The system 100 also inserts references to the program variables corresponding to the dynamic content into the static content so that, when the web application program is executed, the output from the dynamic code is inserted at the proper locations in the static content. As a result, separating the static code from the dynamic code allows a user to edit the static content with a visual form editor rather than editing the code that writes out content statements.

Thus, the inventive conversion tool can convert old web application code into new web application code, eliminating the need to rewrite the web application code from scratch to accommodate new languages. Further, the conversion tool may be designed to separate static content from dynamic content, allowing static portions of the new code to be edited using a form editor.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A system that converts an input code in a first language into an output code in a second language, comprising:
   a plurality of language tables corresponding to a plurality of possible input programming languages, wherein the plurality of language tables receive input programming code corresponding to one of the plurality of possible input programming languages, and the input programming code is functional to produce a first desired output for a first web application;
   a parser having a plurality of parse tables corresponding to a plurality of possible output programming languages, wherein the plurality of parse tables cooperate with the plurality of language tables to translate the input programming code into a computer-readable translated output code that corresponds to a selected one of the plurality of possible output programming languages such that the computer-readable translated output code is functional to produce a second desired output for a different, second web application wherein the second output and the first output are functionally equivalent; and a web browser that displays the first desired output and second desired output.

2. The system of claim 1, including a scanner that reads individual characters from the input programming code and generates tokens by grouping the individual characters together to form the tokens.

3. The system of claim 2, wherein each token has a token type and the parser generates the computer-readable translated output code by referencing one of the plurality of parse tables based on the token type and a current state.

4. The system of claim 3, wherein the token type is at least one selected from the group consisting of a keyword, a symbol, a number, and a variable name.

5. The system of claim 2, wherein the scanner generates the tokens based on information in the plurality of language tables.

6. The system of claim 5, further comprising at least one input language module inherited from one of the plurality of language tables, wherein the input language module contains language-specific information to be accessed by a language table module for use by the scanner.

7. The system of claim 2, further comprising a source class module coupled to the scanner, wherein the scanner accesses the source class module to read the input programming code.

8. The system of claim 7 further comprising:

an interface coupled to the plurality of language tables, the parser, and the source class module to allow selection of one of the plurality of possible output programming languages, one of the plurality of possible input programming languages, and a source class, respectively.

9. The system of claim 8, wherein the interface includes a display, a storage portion, and a processing portion.

10. The system of claim 1, further comprising a plurality of source modules corresponding to different input sources for the input programming code.

11. A method of converting an input code in a first language into an output code in a second language, comprising:

selecting an input programming language from a plurality of possible input languages associated with a plurality of language tables;

selecting an output language from a plurality of possible output languages associated with a parser;

inputting input code corresponding to the selected one of the input programming languages into the plurality of language tables;

reading characters from the input code and generating tokens based upon the characters;

referencing at least one of a plurality of parse tables to translate the input code into a computer-readable translated output code corresponding to the selected one of the plurality of possible output languages, wherein the computer-readable translated output code is functionally equivalent to the input code; and displaying a web page corresponding to the computer-readable translated output code.

12. The method of claim 11, including separating the computer-readable translated output code into static statements and dynamic statements.

13. The method of claim 12, further including transmitting the static statements to a form editor.

14. The method of claim 13, further including transmitting the dynamic statements to a code editor.

15. The method of claim 13, further comprising editing the computer-readable translated code by adding new code in the selected plurality of possible output languages to the computer-readable translated code.

16. A system that converts an input code in a first language into an output code in a second language, comprising:

a first translation module receiving input programming code in a programming language, wherein the input programming code is functional to produce a first output for a first web application;

a second translation module that cooperates with the first translation module to translate the input programming code into a selected one of a plurality of possible output programming languages, the second translation module producing a computer-readable translated output code in the selected one of the plurality of possible output programming languages, wherein the computer-readable translated output code is functional to produce a second output that is functionally equivalent to the first desired output but for a different, second web application; and a web browser that displays the first desired output and second desired output.

* * * * *